(12) United States Patent
Dwyer et al.

(10) Patent No.: US 8,548,945 B2
(45) Date of Patent: Oct. 1, 2013

(54) DATABASE CACHING UTILIZING ASYNCHRONOUS LOG-BASED REPLICATION

(75) Inventors: Eamonn Dwyer, County Kildare (IE); Daniel Kavanagh, Dublin (IE); Michael T. Roche, County Wexford (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/483,384

(22) Filed: May 30, 2012

(65) Prior Publication Data

US 2013/0080386 A1    Mar. 28, 2013

Related U.S. Application Data

(63) Continuation of application No. 13/242,509, filed on Sep. 23, 2011.

(51) Int. Cl.
*G06F 17/00* (2006.01)

(52) U.S. Cl.
USPC ............... 707/634; 707/610; 706/14; 706/15; 711/117

(58) Field of Classification Search
None
See application file for complete search history.

(56) References Cited

U.S. PATENT DOCUMENTS

| | | | |
|---|---|---|---|
| 7,490,083 B2 | 2/2009 | Bourbonnais et al. | |
| 2003/0200209 A1* | 10/2003 | Smith et al. | 707/3 |
| 2003/0212789 A1 | 11/2003 | Hamel et al. | |
| 2004/0267712 A1* | 12/2004 | Papanyan et al. | 707/3 |
| 2006/0085418 A1* | 4/2006 | Piper et al. | 707/8 |
| 2008/0215580 A1 | 9/2008 | Altinel et al. | |
| 2009/0049013 A1* | 2/2009 | Kumbi et al. | 707/3 |
| 2009/0300286 A1* | 12/2009 | Synge | 711/118 |
| 2010/0014863 A1* | 1/2010 | Zami et al. | 398/79 |
| 2010/0287144 A1* | 11/2010 | Cha et al. | 707/693 |
| 2011/0066791 A1* | 3/2011 | Goyal et al. | 711/103 |
| 2012/0221528 A1* | 8/2012 | Renkes et al. | 707/674 |

FOREIGN PATENT DOCUMENTS

| | | |
|---|---|---|
| CN | 101388759 A | 3/2009 |
| CN | 101650678 A | 2/2010 |

OTHER PUBLICATIONS

Mark Hornick ("Session 3: Transparency Layer", Oracle R Enterprise-Training Sessions, 2011).*
"Using Oracle In-Memory Database Cache to Accelerate the Oracle Database", An Oracle Technical White Paper, Jul. 2009.*
PCT International Search Report, PCT International Application No. PCT/CN2012/081806.

* cited by examiner

*Primary Examiner* — Hung Le
(74) *Attorney, Agent, or Firm* — Patents on Demand P.A.; Brian K. Buchheit; Scott M. Garrett (57) ABSTRACT

A database table within a database to persist within a cache as a cached table can be identified. The database can be a relational database management system (RDBMS) or an object oriented database management system (OODBMS). The cache can be a database cache. Database transactions within can be logged within a log table and the cached table within the cache can be flagged as not cached during runtime. An asynchronous replication of the database table to the cached table can be performed. The replication can execute the database transactions within the log table upon the cached table. The cached table can be flagged as cached when the replication is completed.

16 Claims, 7 Drawing Sheets

DATABASE CACHING UTILIZING ASYNCHRONOUS LOG-BASED REPLICATION

CROSS-REFERENCE TO RELATED APPLICATION

This application is a continuation of U.S. patent application Ser. No. 13/242,509, filed Sep. 23, 2011 (pending), which is incorporated herein in its entirety.

BACKGROUND

The present invention relates to the field of database caching.

Many applications today are being developed and deployed on multi-tier environments that often involve browser-based clients, web application servers, and backend databases. These applications frequently need to generate dynamic Web pages on-demand, retrieving necessary content from backend databases. In order to achieve high scalability and performance, database caching is often utilized. In fact, database caching functions as an effective approach to scale down content having to be retrieved from remote databases, thus also scaling down bandwidth utilization and overall user wait times for content.

Traditionally, to facilitate effective cache utilization by applications, the cache is kept synchronized to the target database(s) utilizing synchronous replication. To perform synchronous replication within real world scenarios, approaches commonly vary the locking period and the underlying architecture used to perform the data replication. For instance, some approaches use granular locking. Granular locking, however, imposes severe usability restrictions which often impede application functionality and/or data availability.

BRIEF SUMMARY

One aspect of the present invention can include a system, an apparatus, a computer program product, and a method for improving database caching utilizing asynchronous log-based replication. A database table within a database can be identified to persist within a cache as a cached table. The database can be a relational database management system (RDBMS) or an object-oriented database management system (OODBMS). The cache can be a database cache. Database transactions can be logged within a log table. Additionally, the cached table within the cache can be flagged as not cached during runtime. An asynchronous replication of the database table to the cached table can be performed. The replication can execute the database transactions within the log table upon the cached table. The cached table can be flagged as cached when the replication is completed.

Another aspect of the present invention can include a method, an apparatus, a computer program product, and a system for improving database caching utilizing asynchronous log-based replication. A query router within a database can be configured to route a database request to a database or a cache. The database can be a relational database management system (RDBMS) or an object oriented database management system (OODBMS). The cache can be a database cache. A caching handler can be able to manage the synchronization state of tables replicated within the cache. A replication manager can be configured to asynchronously replicate a database table to a cache via metadata logging.

DETAILED DESCRIPTION

The present disclosure is a solution for improving database caching utilizing asynchronous log-based replication. In the solution, database and/or cache directed queries can be appropriately routed based on cache synchronicity. That is, when a table within the cache is not synchronized (to the database), the solution can route a query to the database and when a table is synchronized, the solution can route the query to the cache. Metadata can be utilized to orchestrate the routing and caching functionality of the disclosure. In one instance, a transparency layer can permit seamless routing and/or caching utilizing asynchronous log-based replication techniques. In this embodiment, checkpoints can be established to control and/or manipulate routing and caching.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
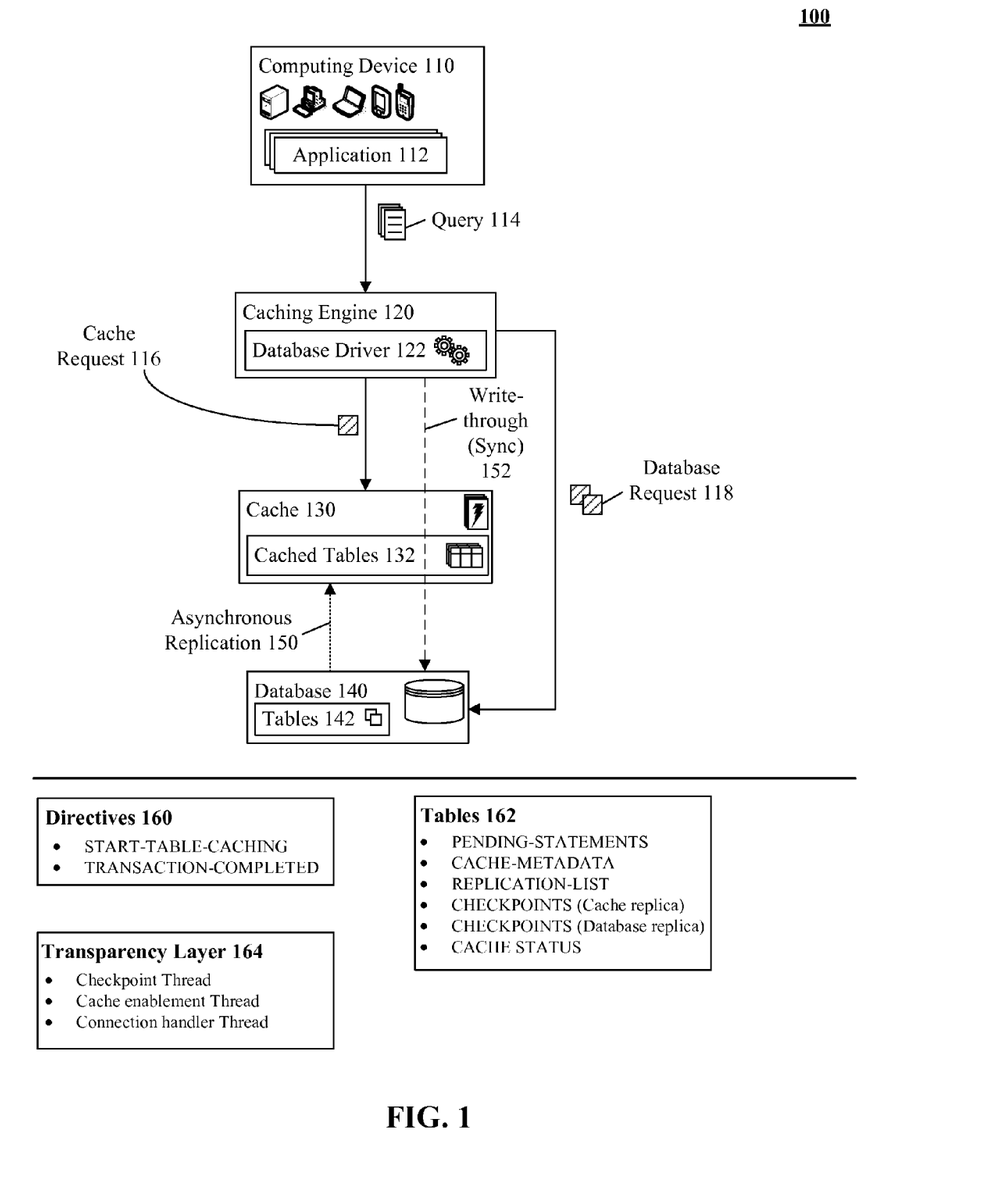
FIG. 1 is a schematic diagram illustrating a system for improving database caching utilizing asynchronous log-based replication in accordance with an embodiment of the inventive arrangements disclosed herein.

FIG. 1 is a schematic diagram illustrating a system 100 for improving database caching utilizing asynchronous log-based replication in accordance with an embodiment of the inventive arrangements disclosed herein. System 100 can be present in the context of method 201, 220, 230, 260, 280, system 300, and method 401. In system 100, an application can convey a query 114 (e.g., database query) to caching engine 120, which can dynamically route the query 114 based on cached tables 132 state. That is, when a cached table 132 is replicated, query 114 can be serviced by cache 130 (e.g., cache request 116). In contrast, when the cached table 132 is not replicated, query 114 can be directed to database 140 (e.g., database request 118). It should be appreciated that the dynamic routing can be transparently performed.

Cached tables 132, 142 state can be tracked using metadata stored within tables 162. Caching of tables 132, 142 and routing of query 114 can be facilitated by caching engine 120. Engine 120 can also provide functionality that makes up transparency layer 164 elements. Transparency layer 164 elements (e.g., checkpointing thread) can perform necessary operations to maintain cache concurrency and facilitate routing actions. For example, layer 164 can enable asynchronous replication 150 of tables 142 from database 140 to cache 130 (e.g., tables 132). It should be appreciated that the disclosure can enable the avoidance of locking scenarios during synchronization of database and cache.

As used herein, metadata can be logging information used to track the state of cached tables 132 and/or tables 142. Metadata can include database table entries, database directives (e.g., directives 160), database logs, error logs, and the like. Directives 160 can be one or more database compliant commands able to perform a database operation. Directives 160 can include commands able to begin table caching, complete table caching, and the like. For example, directives 160 can be a start-table-caching and transaction-completed directive.

Tables 162 can be a database compliant data set storing metadata utilized in asynchronous replication. Tables 162 can include object tables, relational tables, and the like. Tables 162 can include, but is not limited to, a pending statements table, a cache metadata table, a replication list table, a checkpoint table and a cache status table. Pending statements table can include a list of cached tables 132 and/or transactions which have affected tables 132. Cache metadata table can be a table including a list of user requests to initiate or end caching of table(s) 142. In one instance, cache metadata table can be populated by cache configuration tools. Replication list table can include a list of tables 142 undergoing a continuous copy (i.e. asynchronous replication) from database 140 to cache 130. Checkpoint table can include data utilized in synchronizing database 140 contents with cache 130. The checkpoint table can exist in both the cache 130 and database 140 and can undergo a continuous copy (i.e. asynchronous replication).

Based on metadata within tables 162, caching engine 120 can intelligently route query 114 to cache 130 or, alternatively, database 140. Engine 120 can convey query 114 to cache 130 as cache request 116 when cached tables 132 are synchronized. For example, when a query 114 references a table which is marked as clean within cache 130, the request 116 can be conveyed to cache 130. Cache request 116 can be processed/fulfilled and an appropriate response (not shown) can be conveyed. Engine 120 can convey query 114 to database 140 as database request 118 when cached tables 132 are not synchronized. For instance, when a query 114 references a table which is marked as dirty within cache 130, the request 118 can be conveyed to database 140. Database request 118 can be processed/fulfilled and an appropriate result (not shown) can be conveyed.

Transparency layer 164 can be an abstraction layer able to perform routing and/or asynchronous log-based replication. Layer 164 can include, but is not limited to, a checkpoint thread, a cache status thread, a connection handler thread, and the like. Layer 164 can include one or more elements of engine 120, cache 130, and/or database 140. Checkpoint thread can be used to discover user specified tables to be cached have been synchronized with the backend (e.g., these can be tables undergoing asynchronous replication from database to cache). This approach can avoid costly blocking. Checkpoint thread can scan the checkpoints table in the cache and can affect pending statements table (e.g., tables 162) and the cache status table. Cache enablement thread can poll cache metadata table to determine which tables are selected for caching. Cache enablement thread can affect cache metadata table, replication list table, and/or cache status table. Connection handler thread can permit management of transactions associated with database 140 and/or cache 130. Connection handler thread can affect pending statements table (e.g., tables 162) and/or checkpoints table (e.g., tables 162).

In one instance, caching engine 120 can include a database driver 122 component. In the instance, database driver 122 can be a software program permitting dynamic routing of queries between cache 130 and/or database 140. For example, database driver 122 can be a Java Database Connectivity (JDBC) driver able to dynamically route query 114 request.

In another instance, caching engine 120 can permit write-through 152 to be performed. In the instance, when a write is performed within cache 130, the change can be replicated to the database 140. For example, a synchronous write can include the translation of structured query language (SQL) statement.

In one embodiment, caching engine 120 can be an element of a middleware software. For example, engine 120 can be a component of a proxy, load balancer, and the like.

Computing device 110 can be a hardware/software entity permitting the execution of application 112. Computing device 110 can include, but is not limited to, a desktop computer, a laptop computer, a tablet computing device, a personal digital assistant (PDA), a mobile phone, and the like. Device 110 can be communicatively linked to cache 130 and/or database 140. Application 112 can be a software program able to generate and/or process query 114. Application 112 can communicate with database driver 122 utilizing caching engine 120 via one or more traditional and/or proprietary mechanisms.

Drawings presented herein are for illustrative purposes only and should not be construed to limit the invention in any regard. System 100 can be an abstract representation of the functionality of the disclosure. It should be appreciated that components 110-140 can be distributed across a number of locations geographically, distributed across one or more networks, and the like.

FIGS. 2A-2E are a set of flow charts illustrating a set of methods 201, 220, 230, 260, 280 for improving database caching utilizing asynchronous log-based replication in accordance with an embodiment of the inventive arrangements disclosed herein. Methods 201, 220, 230, 260, 280 can be present in the context of system 100, 300, and method 401. The cache enablement thread (e.g., FIG. 2A) can constantly poll the cache metadata table. The metadata table can be populated via tooling when a user identifies that a table should be cached or removed from the cache.

New entries in the cache metadata table can result in tables which are cache requested to undergo asynchronous replication (i.e. are added to the replication list table). Additionally, the disclosure can write data to the checkpoints table in the database. As this table can simultaneously undergo asynchronous replication, the checkpoints thread (e.g., FIG. 2B) can detect when the cache has received updates to the database by examining the checkpoints replica in the cache. Consequently the system can detect when cache and database are synchronized. The connection handler thread can manage the routing of database requests (e.g. JDBC, ODBC, etc). The handler thread can perform routing management by accessing the cache status table to discover the readiness of a cached replica of a table.

Furthermore, the disclosure can detect if cache enablement has not occurred within a defined time period/number of attempts. When this state is detected, a number of corrective actions can be enacted (e.g., FIG. 4). Upon initial startup, the disclosure can behave as described in the following paragraphs.

When a database request is received (e.g., FIG. 2C), as per method 260, the cache status for referenced tables can be determined (e.g., step 266). This information can be maintained in the cache status table, which can be initialized as empty on start up (and can be populated only when a user requests that a table is to be cached, as per FIG. 2A).

Consequently, the system can determine whether the database request can be routed to the cache (e.g. cache status=cached as per method 268), whether it must be routed to the database as the cache is not ready (e.g. cache status=initialized_clean or cache_status=initialized dirty as per methods 270, 272) or whether the request refers to a non-cache requested table (e.g. no cache status entry, as per method 274). By default, tables can be initialized as non-cache requested.

Where the request is for a non-cache requested table, the disclosure can determine the query type which can include a read, a write, a commit, or rollback.

When the request for a non-cache requested table is a read statement, the request can be directed to the database and no further action can be necessary (e.g., step 206).

When the request for a non-cache requested table triggers a write to the database, information pertaining to the write can be recorded to the pending statements table (e.g., step 208). Information can include a transaction identifier and the table(s) referenced for update. The write request can be routed to the database in step 209.

When the request for a non-cache requested table is a commit, a transaction completed checkpoint can be inserted into the checkpoints table in the database. As this table can undergo asynchronous replication, the information (e.g., transaction identifier) can be used to synchronize database changes with the cache at a transaction level. The commit can be routed to the database in step 216.

When the request for a non cache requested table is a rollback, all entries associated with the transaction can be removed from the pending statements table (e.g., step 210). That is, the request is no longer pending. The request is routed to the database in step 218.

When the database request is for a table that is cache requested and cache ready (e.g. a cache status of cached), the request can be routed directly to the cache (e.g. method 268). When a request is a write, a write-through mechanism can be used to ensure the write is performed on both frontend (e.g., cache) and backend (e.g., database), thus maintaining database synchronicity.

Figure 2A:
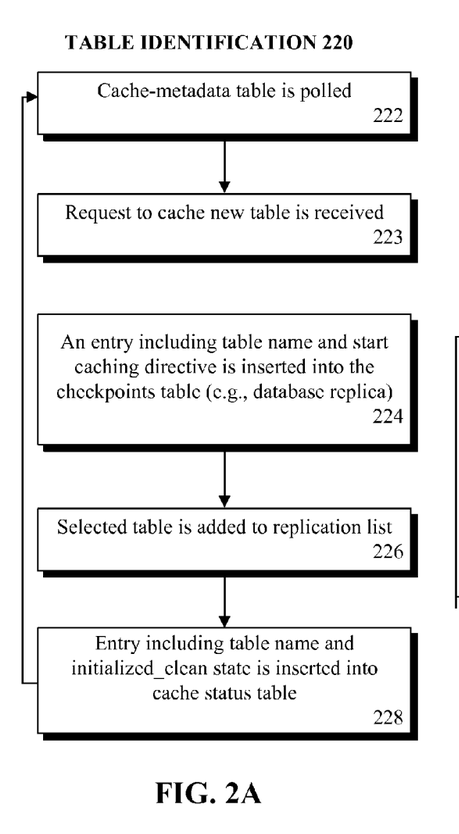
FIGS. 2A-2E are a set of flowcharts illustrating a set of methods for improving database caching utilizing asynchronous log-based replication in accordance with an embodiment of the inventive arrangements disclosed herein.
Figure 2B:
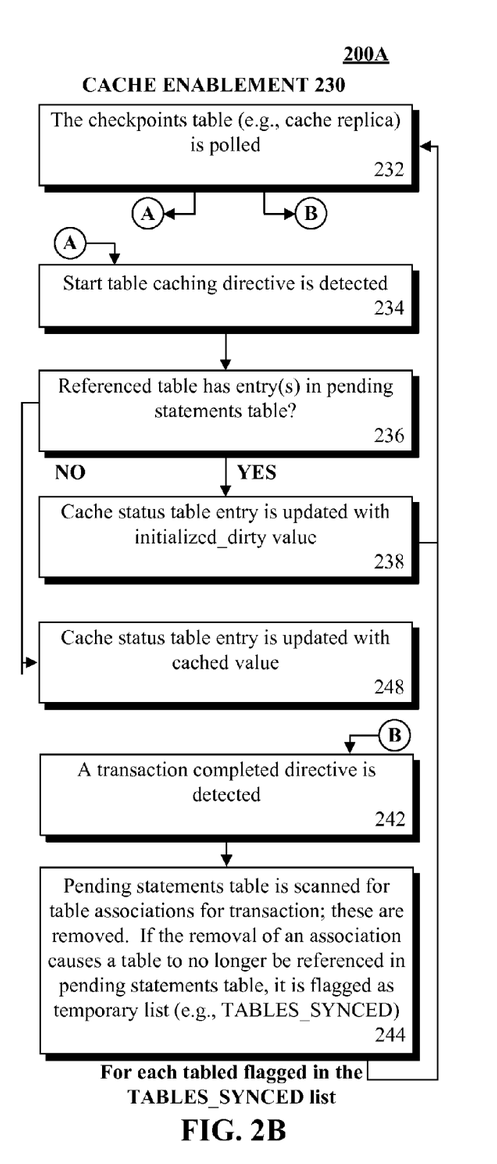
Figure 2C:
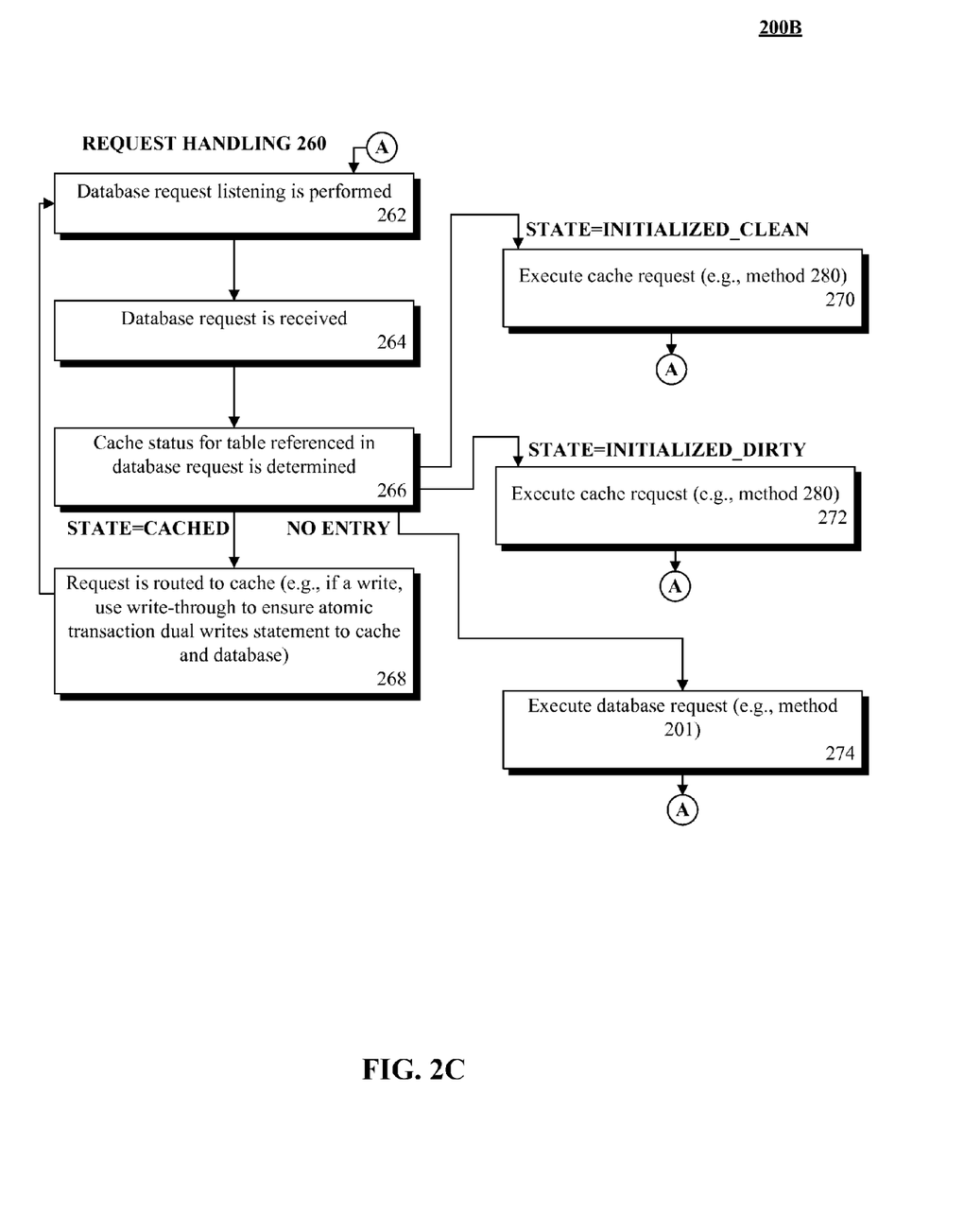
Figure 2D:
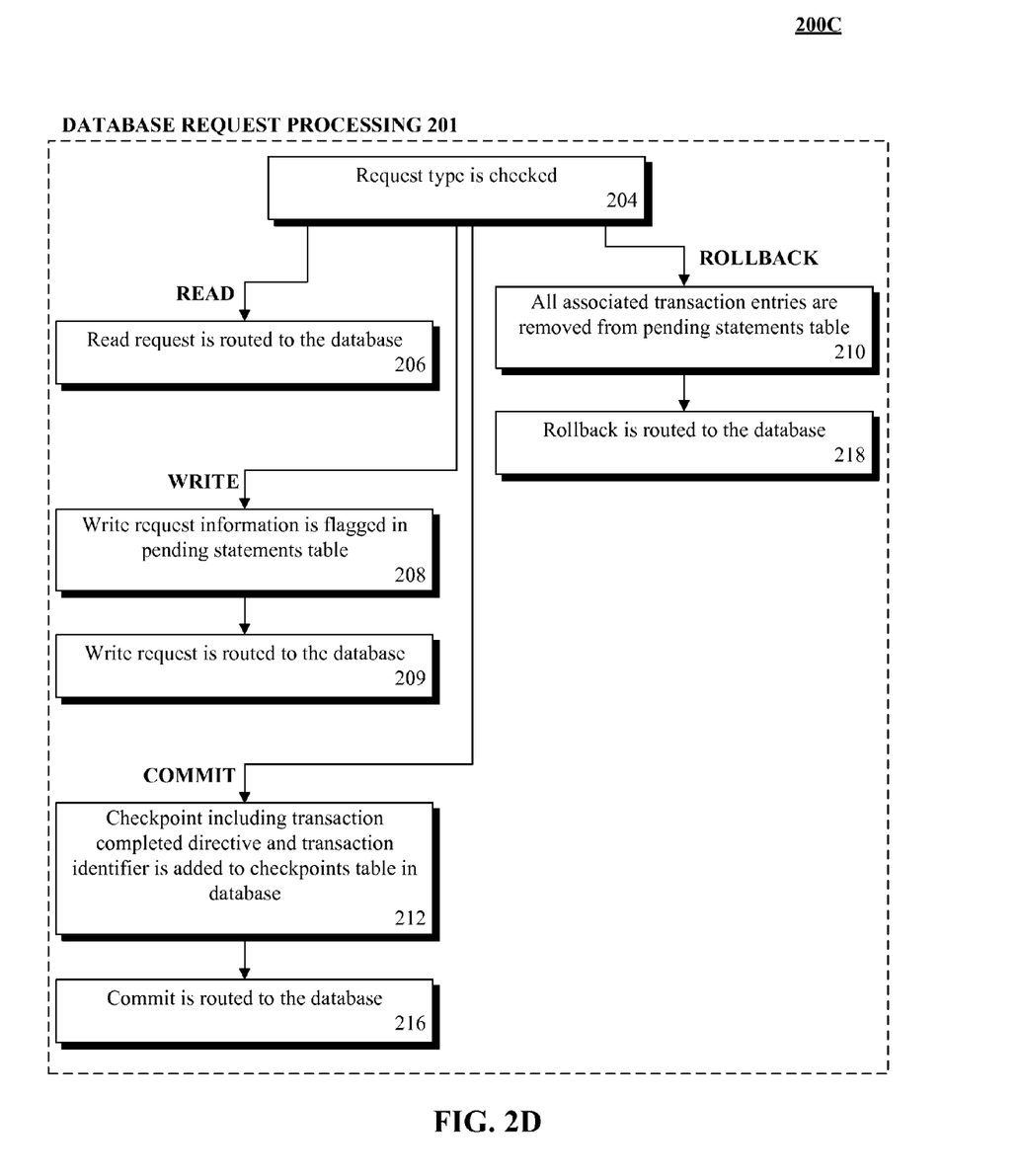
Figure 2E:
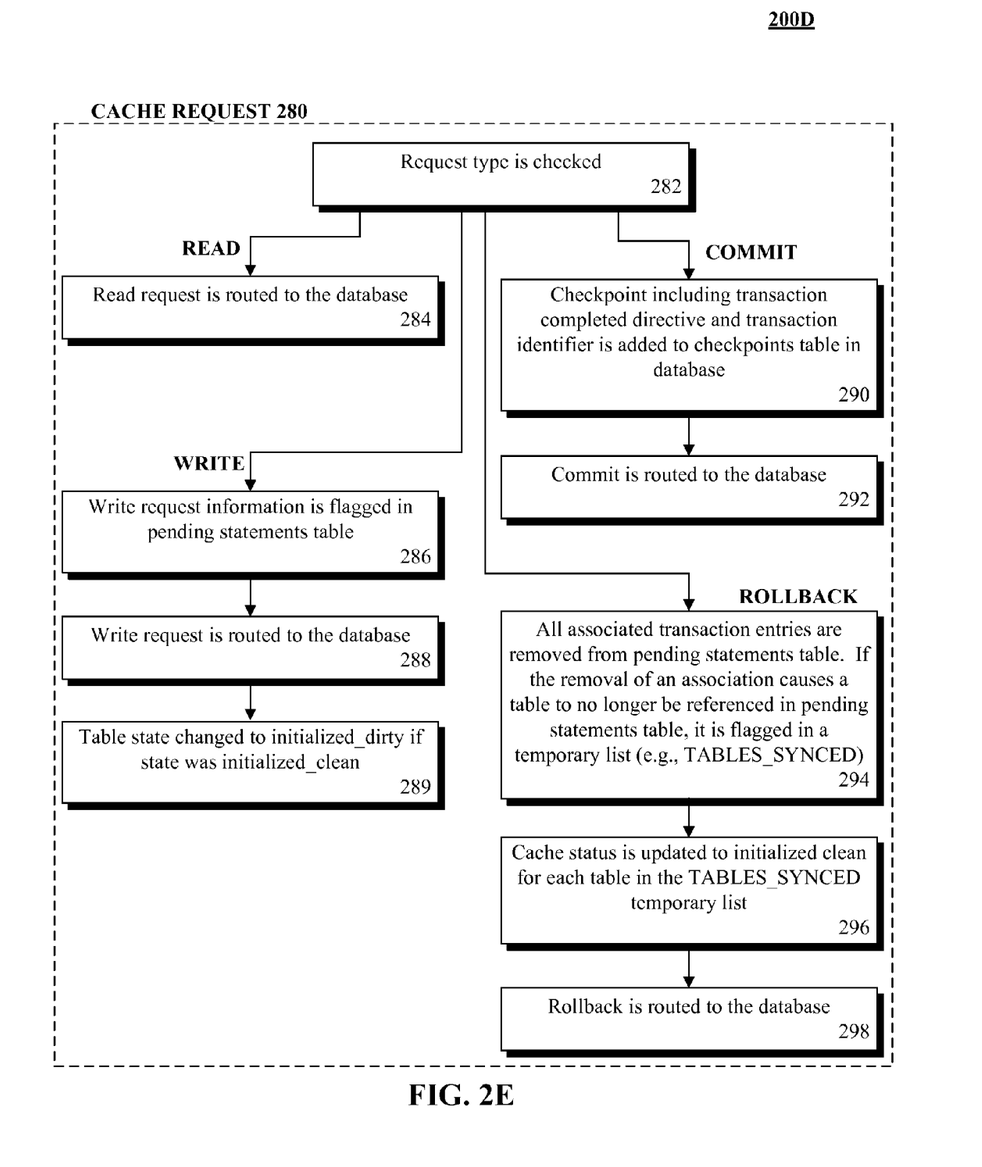

When the database request is for a table that is cache requested and cache unready (i.e. table has a cache status value of either "initialized_clean" or "initialized_dirty"), the request can be routed to the database using the routing logic described in FIG. 2E. Specifically, in FIG. 2E the database request can be determined to be a read, a write, a commit, or rollback.

When the database request is for a cache requested, cache unready table and the request (e.g. statement) is a read, the request can be directed to the database and no further action can be necessary (e.g., step 284).

When the database request is for a cache requested, cache unready table and the request triggers a write to the database (e.g., step 286), information pertaining to the write can be recorded to the pending statements table (e.g., step 286). The information can include a transaction identifier and the table(s) referenced for an update. The write request can be routed to the database (e.g., step 288) and the table state in the cache status table can be updated to initialized_dirty (e.g., step 289).

When the database request is for a cache requested, cache unready table and the request is a commit (e.g., step 290), a transaction completed checkpoint can be inserted into the checkpoints table in the database. As the checkpoints table undergoes asynchronous replication, the information can be used to synchronize database changes with the cache at a transaction level. The commit can be routed to the database (e.g., step 292).

When the database request is for a cache requested, cache unready table and the request is a rollback (e.g., step 294), all entries associated with the transaction can be removed from the pending statements table (i.e., they are no longer pending). When the removal of transaction occurs and the transaction is no longer referenced in the pending statements table, the associated table entry in the cache status table can be updated to initialized_clean (e.g., step 296) and the request can be routed to the database (e.g., step 298).

Method 220 (shown in FIG. 2A) can involve the continual polling of the cache metadata table. This can allow the disclosure to detect when a user requests that a table should be cached, or removed from the cache. Table identification method 220 can be manually and/or automatically performed.

In step 224, an entry associated with the selected table can be inserted into the checkpoints table in the database replica. The entry can include a table name and a start-table-caching directive. The checkpoints table can be pre-configured by the system to undergo asynchronous replication from database to cache and can be used to detect when the cached version of the table is up-to-date with the database. When the table is concurrent, the disclosure can start servicing table requests in the cache.

In step 226, the table identified for caching can be added to replication list, causing the table to undergo asynchronous replication from database to cache. Finally, in step 228, the disclosure can update the cache status table to indicate that the table is cache requested (i.e. initialized_clean). The method can be continuously performed during runtime.

Method 230 (shown in FIG. 2B) can include the continual polling of the checkpoints table in the cache replica. As the table is undergoing asynchronous replication from database to cache, entries within the table can allow the disclosure to detect requests to cache data and can also convey synchronization information.

In step 232, the cache replica of the checkpoints table can be polled. In step 234, it can be determined whether a start table caching directive was received or a transaction completed directive was received. When the former is detected method can continue to step 234, the latter can cause the method to proceed to step 242. When a start table caching directive is received (e.g., step 234), the disclosure can check the pending statements table (e.g., step 236) to determine if the disclosure (e.g., caching engine) is ready to service requests in the cache. The determination can be performed by checking if the table name referenced in the start caching directive has any outstanding writes which have not been synchronized (e.g., entries in the pending statements table).

If no such entries are detected, step 248 can trigger updates to the cache status entry for the table with a value of "cached". The update can allow the caching engine (e.g., FIG. 2C) to route future table requests to the cache. If, however, one or more entries are detected, step 238 can trigger updates to the cache status entry for the table with a value of "initialized_dirty". The caching engine (e.g., FIG. 2C) can continue to direct table requests to the database. Further transaction completed directives can be required to synchronize cache and database.

Alternatively and in one embodiment, when a transaction completed directive is received (e.g., step 242), the disclosure can scan the pending statements table. That is, the entries are no longer pending and they have been synchronized with the cache. All such entries can be removed from the pending statements table (e.g., step 244). Furthermore, when the removal of an entry causes a table to no longer be referenced by the pending statements table, the table can be deemed ready for caching. This can be accomplished via step 236, as described above. Changes to the cache status table, resulting from method 230 (e.g., FIG. 2B) can affect the request routing (routing is described in FIG. 2C).

Drawings presented herein are for illustrative purposes only and should not be construed to limit the invention in any regard. It should be appreciated that processes 201, 220, 230, 260, 280 can represent one embodiment for performing asynchronous log-based caching.

Figure 3:
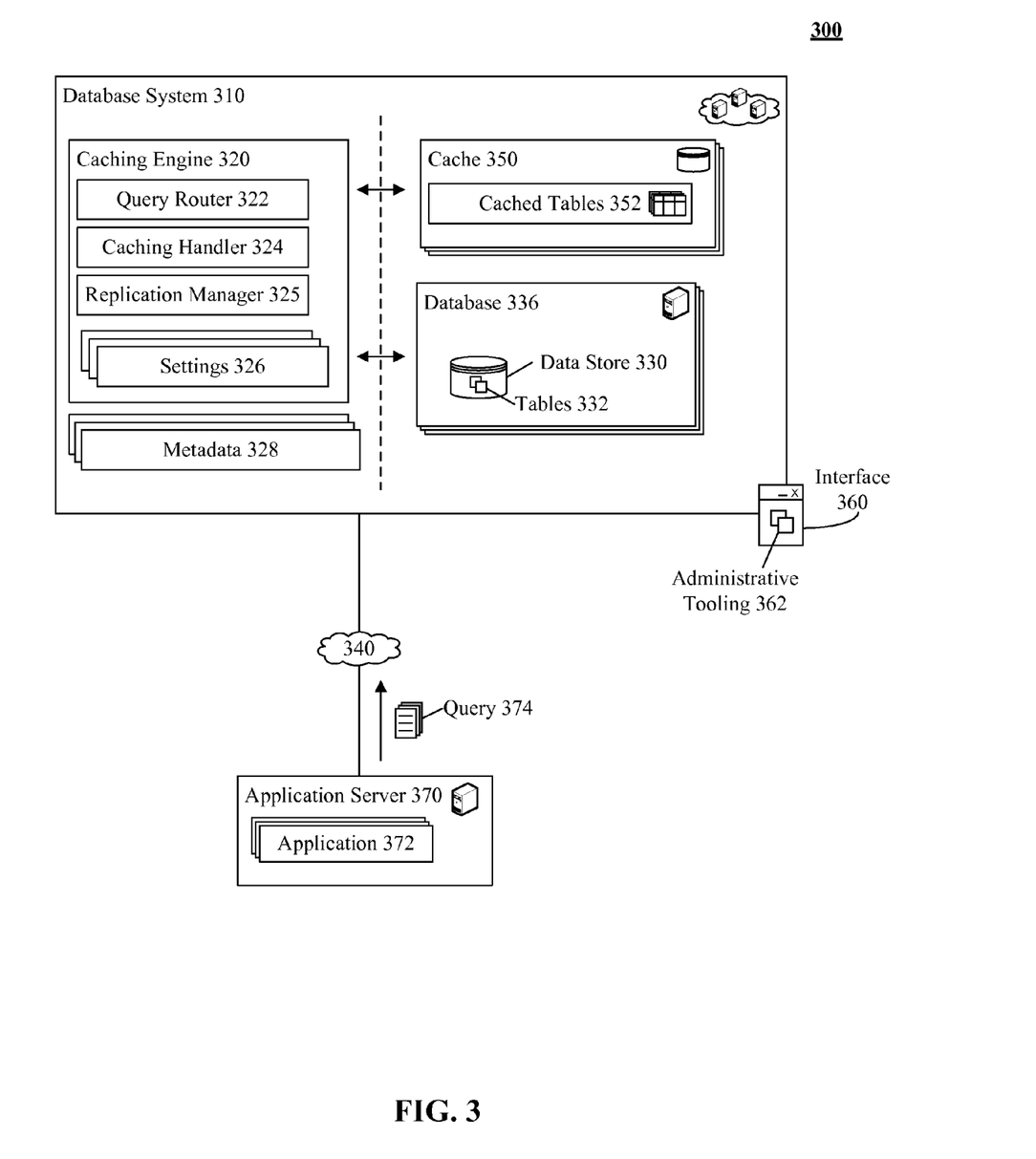
FIG. 3 is a schematic diagram illustrating a system for improving database caching utilizing asynchronous log-based replication in accordance with an embodiment of the inventive arrangements disclosed herein.

FIG. 3 is a schematic diagram illustrating a system 300 for improving database caching utilizing asynchronous log-based replication in accordance with an embodiment of the inventive arrangements disclosed herein. System 300 can be present in the context of system 100, method 201, 220, 230, 260, 280 and method 401. In system 300, a database system 310 can be associated with a caching engine 320, a database 336, and a cache 350. Engine 320 can permit intelligent asynchronous replication of tables 332 to cache 350 while minimizing locking scenarios. System 310 can be communicatively linked with application server 370 via network 340. In system 300, query 374 generated from application 372 can be conveyed to system 310. Caching engine 320 can appropriately route the query to cache 350 or database 336 based on cached 352 table state.

System 310 can be a database management system permitting query 374 to be processed by database 336 or cache 350 based on tables 352 state. System 310 can include, but is not limited to, caching engine 320, metadata 328, database 336, cache 350, interface 360, and the like. System 310 can be a component of a distributed computing environment, networked computing environment, and the like. It should be appreciated that system 310 can utilize cache 350 to minimize resource intensive database 336 access. System 310 can be a component of a database management system (DBMS).

Caching engine 320 can be a hardware/software element capable of asynchronous log-based replication of tables 332 to cache 350 (e.g., resulting in cached tables 352). Engine 320 can include, but is not limited to, query router 322, caching handler 324, replication manager 325, settings 326, and the like. Engine 320 can respond to table 332, 352 state in real-time and/or near real time. In one instance, engine 320 can be a component of an application programming interface (API). In one embodiment, engine 320 can be a component of a transparency layer of an IBM SOLIDDB database. Engine 320 functionality can include, but is not limited to, cache coherence resolution, encryption capabilities, and the like.

Query router 322 can be a hardware/software entity configured to receive a database query and appropriately route the query to cache 350 or database 336. For example, using metadata 238, router 322 can direct query 374 to cache 350 when tables 352 are determined to be concurrent. Router 322 can be utilized to identify one or more tables associated with the query. Router 322 can communicate with handler 324 to determine table state. Table state can be evaluated and router 322 can process the query based on one or more settings 326.

Caching handler 324 can be a hardware/software component able to determine table 352 state and generate metadata 328 utilized in performing asynchronous log-based replication. In one instance, handler 324 can flag tables 352 with one or more values indicating the current state of table 352. In the instance, handler 324 can flag tables 352 as dirty, clean, in an error state, and the like. In one embodiment, handler 324 can register available caches which can be utilized to service queries (e.g., query 374). For example, localized and/or remote caches can be identified permitting rapid query response when a localized cache is in synchronicity.

Replication manager 325 can be a hardware/software element for performing asynchronous replication utilizing metadata 328. Manager 325 functionality can include database 336 access operations (e.g., administrative authentication), cache 350 access functionality, asynchronous replication, synchronous replication, and the like. In one instance, manager 325 can be utilized to replicate tables 332 to one or more caches. In one instance, manager 325 can permit tables 332 changes to triggered replication.

Settings 326 can be one or more configuration options for determining the behavior of system 310 and/or system 300. Settings 326 can include, but is not limited to, query router 322 settings, caching handler 324 options, replication manager 325 parameters, metadata 328 options, and the like. In one instance, settings 326 can be configured through administrative tooling 362.

Metadata 328 can be a data set utilized by caching engine 320 to track table 332, 352 states. Metadata 328 can be stored within database system 310, caching engine 320, data store 330, cache 350, and the like. Metadata 328 can be continually updated during system 310 operation. Metadata 328 can include transaction identifiers, table identifiers, state values, and the like.

Cache 350 can be a hardware/software component configured to store cached tables 352. Cache 350 can include cached tables 352, configuration settings, metadata, and the like. In one instance, cache 350 can include multiple caches which can be local and/or remotely linked to system 310. Cache 350 can include multiple cache granularity including, but not limited to, database level, table level and result-set caching.

Cached tables 352 can be a replicated version of data store 330 maintained tables 332 that can be stored within cache 350. Tables 352 can be associated with a table identifier, table name, state value, and the like. Cached tables 352 can be associated with candidate keys, constraints, triggers, and the like. Cached tables 352 can be continually updated in response to changes within tables 332.

Tables 332 can be an organized data set stored within data store 330. Tables 332 can include data, metadata, and the like. Tables 332 can conform to traditional and/or proprietary data models including, but not limited to, relational model, entity-relationship model, object model, and the like. Tables 332 can be associated with candidate keys, constraints, triggers, views, and the like.

Database 336 can be a hardware/software data repository able to store tables 332. Database 336 can include, but is not limited to, data store 330, database settings, and the like. Database 336 can include administrative interfaces, management tooling, and the like. Database 336 can be communicatively linked to engine 320 via one or more conventional and/or proprietary mechanisms. Database 336 can include, but is not limited to, a distributed database, real-time database, data warehouse, database cluster and the like. Database 336 can be associated with one or more languages including, but not limited to, structured query language (SQL), object query language (OQL), and the like.

Data store 330 can be a hardware/software component able to store tables 332. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to database 336 and/or system 310 in one or more traditional and/or proprietary mechanisms.

Network 340 can be an electrical and/or computer network connecting one or more system 300 components. Network 340 can include, but is not limited to, twisted pair cabling, optical fiber, coaxial cable, and the like. Network 340 can include any combination of wired and/or wireless components. Network 340 topologies can include, but is not limited to, bus, star, mesh, and the like. Network 340 types can include, but is not limited to, Local Area Network (LAN), Wide Area Network (WAN), Virtual Private Network (VPN) and the like.

Interface 360 can be a user interactive component permitting interaction administrative tooling. Interface 360 capabilities can include a graphical user interface (GUI), voice user interface (VUI), mixed-mode interface, and the like. Interface 360 can be communicatively linked to system 310 in one or more traditional and/or proprietary fashions. In one instance, interface 360 can be a Web browser presenting administrative tooling 362. In another instance, interface 360 can be a desktop interface communicatively linked via a terminal client.

Administrative tooling 362 can be a hardware/software element for managing caching engine 320, cache 350, and/or database 336. In one instance, tooling 362 can be utilized to address replication failures. In the instance, tooling 362 can present notifications when replication of a table does not succeed. In another instance, tooling 362 can be used to manually synchronize tables which can be associated with replication errors. For example, a user can request a table to be cached immediately using the blocking technique described in FIG. 4 (step 410)

Application server 370 can be a hardware/software component configured to execute application 372. Application server 370 can include, but is not limited to, application 372, application 372 settings, server 370 settings, and the like. For example, application 370 server can be an IBM WEBSPHERE SERVER.

Query 374 can be a database query generated from application 372. Query 374 can include, but is not limited to, a structured query language (SQL) query, XQuery query, and the like. Query 374 can be associated with compression technologies, encryption processes, and the like. Query 374 can include, but is not limited to, a directive, a transaction, multiple transactions, distributed transactions, and the like. A transaction can be a unit of work performed within a database management system. Transaction can include, but is not limited to, a commit, a rollback, and the like.

Drawings presented herein are for illustrative purposes only and should not be construed to limit the invention in any regard. System 300 can be a component of a distributed computing system, networked computing system, cloud-based computing system, and the like. In one instance, system 300 can be a component of a service oriented architecture (SOA). It should be appreciated that database system 310 can conform to Atomicity Consistency Isolation Durability (ACID) rules. System 300 can utilize proprietary and/or traditional security mechanisms to ensure replication is performed securely.

Figure 4:
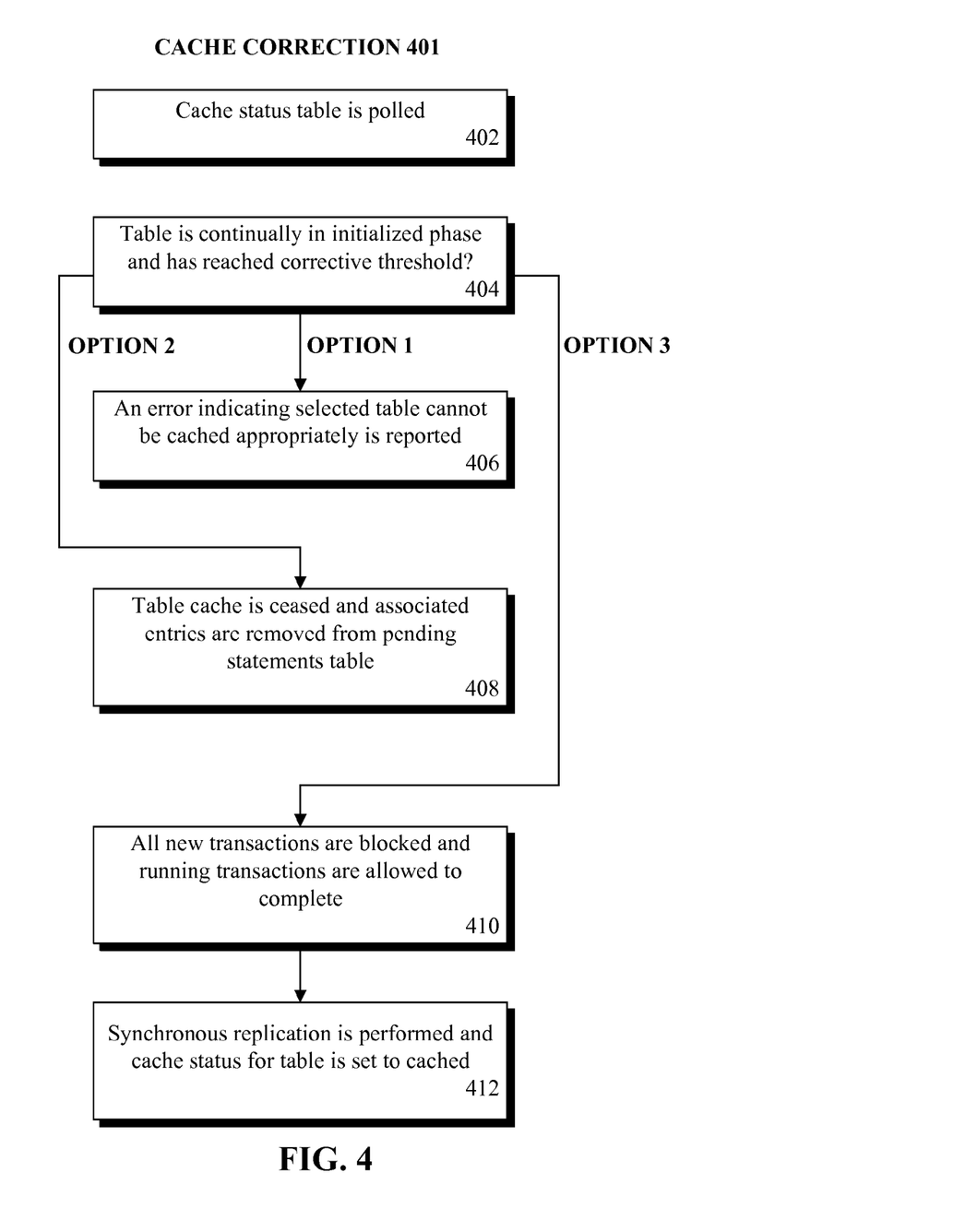
FIG. 4 is a flowchart illustrating a method for cache corrective functionality for improving database caching utilizing asynchronous log-based replication in accordance with an embodiment of inventive arrangements disclosed herein.

FIG. 4 is a flowchart illustrating a method 401 for cache corrective functionality for improving database caching utilizing asynchronous log-based replication in accordance with an embodiment of inventive arrangements disclosed herein. Method 401 can be performed in the context of system 100, method 201, 220, 230, 260, 280, and system 300. Method 401 can describe steps which the disclosure can execute to detect and react to failures to synchronize cache and database.

In step 402, the cache status table can be polled. The cache table can be augmented with a column indicating the first/last incident that synchronization was attempted or frequency that synchronization was attempted (e.g., checkpoint directives received). The information within the cache table can be used to describe a corrective threshold. In step 404, the disclosure can detect whether the corrective threshold was exceeded. For example, the cache engine can attempt to enable a table for caching for a specified time interval (e.g. 5 minutes).

In cases where caching does not start within the specified criteria/threshold, a number of different options can be carried out, depending on user requirements. In step 406, an error can be logged or an alert can be generated when a database request attempts to access table associated with a caching failure. In step 408, the disclosure can remove the entry from the cache metadata table and cache status table, effectively marking it as "uncached". In one instance, an associated warning can be logged. In step 410, the disclosure can allow running transactions to complete while blocking new transactions. A synchronous replication can be performed from backend to cache for the table requested for caching. Upon completion, the cache status table entry can be set to cached and the database request handler can start servicing new transactions again.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
identifying a database table within a database to persist within a cache as a cached table, wherein the database is at least one of a relational database management system (RDBMS) and an object oriented database management system (OODBMS), wherein the cache is a database cache;
logging a plurality of database transactions within a log table and flagging the cached table within the cache as not cached during runtime;
responsive to a commit action, inserting a checkpoint entry into a checkpoints table, wherein the checkpoint entry is at least one of a transaction identifier and a transaction completed directive;
performing an asynchronous replication of the database table to the cached table, wherein the replication executes the plurality of database transactions within the log table upon the cached table; and
when the replication is completed, flagging the cached table as cached; and
updating a pending statement table with the database table name and the transaction identifier of a query statement writing to the database table.

2. The method of claim 1, further comprising:
receiving a database query directed to the database; and
when a cached table within a cache is flagged as cached, redirecting the query to the cache.

3. The method of claim 1, further comprising:
responsive to a rollback action, removing one or more transaction entries within a pending statements table, wherein the one or more transaction entries are transactions associated with the rollback.

4. The method of claim 1, further comprising:
polling a cache metadata table to determine a table to persist within the cache.

5. The method of claim 1, further comprising:
receiving a start table caching directive within a checkpoints table.

6. The method of claim 1, further comprising:
receiving a transaction completed directive within a checkpoints table, wherein the directive is associated with a transaction identifier; and
removing entries within a pending statements table associated with the transaction identifier.

7. The method of claim 1, further comprising:
performing a corrective action when a cached table state is equivalent to a corrective threshold.

8. The method of claim 1, wherein the method is performed within a transparency layer.

9. A method comprising:
identifying a database table within a database to persist within a cache as a cached table, wherein the database is at least one of a relational database management system (RDBMS) and an object oriented database management system (OODBMS), wherein the cache is a database cache;
logging a plurality of database transactions within a log table and flagging the cached table within the cache as not cached during runtime;
responsive to a rollback action, removing one or more transaction entries within a pending statements table, wherein the one or more transaction entries are transactions associated with the rollback;
performing an asynchronous replication of the database table to the cached table, wherein the replication executes the plurality of database transactions within the log table upon the cached table; and
when the replication is completed, flagging the cached table as cached; and updating a pending statement table with the database table name and the transaction identifier of a query statement writing to the database table.

10. The method of claim 9, further comprising:
receiving a database query directed to the database; and
when a cached table within a cache is flagged as cached, redirecting the query to the cache.

11. The method of claim 9, further comprising:
responsive to a commit action, inserting a checkpoint entry into a checkpoints table, wherein the checkpoint entry is at least one of a transaction identifier and a transaction completed directive.

12. The method of claim 9, wherein the method is performed within a transparency layer.

13. A method comprising:
identifying a database table within a database to persist within a cache as a cached table, wherein the database is at least one of a relational database management system (RDBMS) and an object oriented database management system (OODBMS), wherein the cache is a database cache;
logging a plurality of database transactions within a log table and flagging the cached table within the cache as not cached during runtime;
receiving a transaction completed directive within a checkpoints table, wherein the directive is associated with a transaction identifier; and
removing entries within a pending statements table associated with the transaction identifier;
performing an asynchronous replication of the database table to the cached table, wherein the replication executes the plurality of database transactions within the log table upon the cached table; and
when the replication is completed, flagging the cached table as cached; and
updating a pending statement table with the database table name and the transaction identifier of a query statement writing to the database table.

14. The method of claim 13, further comprising:
responsive to a rollback action, removing one or more transaction entries within a pending statements table, wherein the one or more transaction entries are transactions associated with the rollback.

15. The method of claim 13, further comprising:
responsive to a commit action, inserting a checkpoint entry into a checkpoints table, wherein the checkpoint entry is at least one of a transaction identifier and a transaction completed directive.

16. The method of claim 13, wherein the method is performed within a transparency layer.

\* \* \* \* \*